J. Chase.
Turbine Water Wheel.

Nº 94,868.      Patented Sept. 14, 1869.

Witnesses
J. W. Coombs
Fred. Haynes

Inventor
John Chase

United States Patent Office.

JOHN CHASE, OF PATERSON, NEW JERSEY.

Letters Patent No. 94,868, dated September 14, 1869.

IMPROVEMENT IN TURBINE WATER-WHEELS.

The Schedule referred to in these Letters Patent and making part of the same.

*To all whom it may concern:*

Be it known that I, JOHN CHASE, of Paterson, in the county of Passaic, and State of New Jersey, have invented a new and useful Improvement in Water-Wheel Gates, of which the following is a full, clear, and exact description, reference being had to the accompanying drawing, forming part of this specification, and in which—

Figure 1:
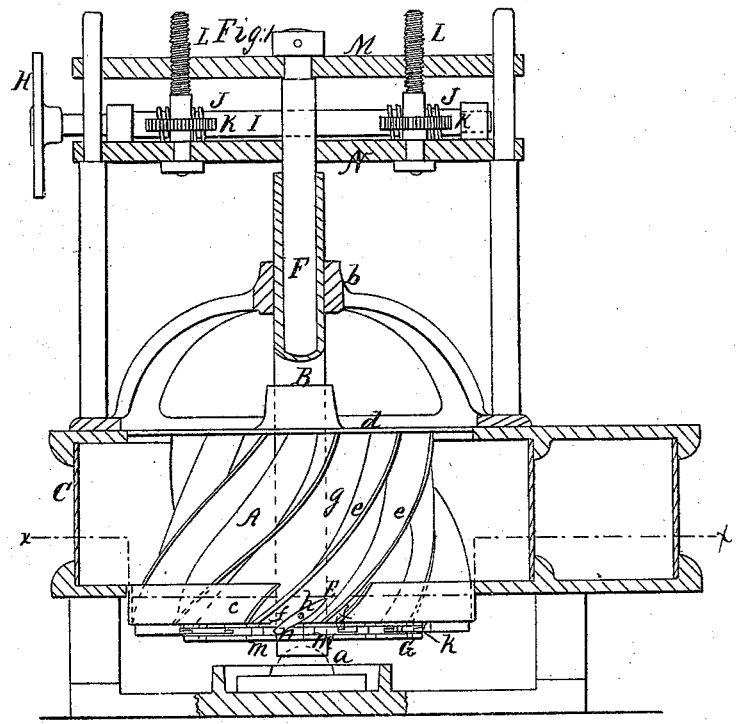
Figure 2:
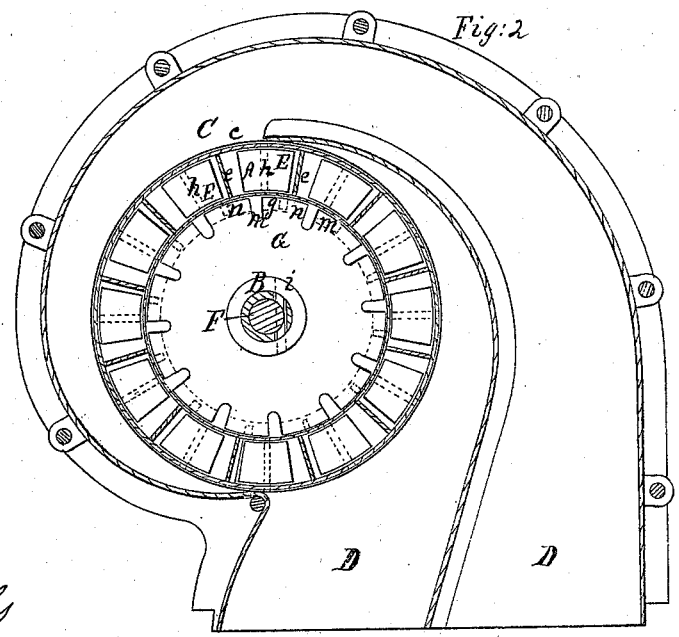

Figure 1 represents an elevation of a water-wheel with its connections, in partial section, and having my improvement applied to it, and Figure 2, a horizontal section of the same, taken mainly as indicated by the line $x\ x$ in fig. 1.

Similar letters of reference indicate corresponding parts.

My improvement has reference to water-wheels of a horizontal character, in which the water is made to act by its impulse or weight, or both combined, on buckets, and is alike applicable to such wheels, whether the discharge from them be arranged on the outside, inside, or below the buckets; but it will here suffice to describe said improvement as applied to a wheel in which the water entering on the outside of the buckets is permitted to escape down through or below them.

The invention consists in a combination with such a wheel or wheels, of a gate made up of a series of valves or independent throttling-devices to the discharging-mouths of the spaces between the buckets, and arranged to rotate in common with the wheel; also, though separately hung, being jointly operative to open and close or regulate as required, either by hand or through the intervention of a governor, the several discharge-openings or outlets from or between the buckets, for the purpose of stopping, starting, and regulating the speed of the wheel.

And the invention further consists in such a construction or combination of parts, as that said throttling-valves or devices are made capable of being operated or adjusted from or through the centre of the wheel and its carrying or driving-shaft.

Referring to the accompanying drawing—

A represents a wheel of the character described, though of improved construction as regards the disposition and shape of its buckets or bucket-spaces, but which special feature of improvement forms no part of the present invention.

Said wheel is secured to a vertical hollow shaft, B, working on a step, $a$, below, and suitably guided by a bearing, $b$, above, and is arranged to work within a case, C, which is open below for the free passage of a bottom outer ring, $c$, to the wheel through it, but closed above by a plate or disk, $d$, secured to the main or driving-shaft B.

The water is admitted to this case to act upon the wheel through side flumes D D, said water entering between the buckets $e\ e$, from the outside, or, as it may be termed, outer periphery of the wheel, and, after having performed its duty, being discharged below or from between the bottom edges of the buckets, through mouths $f\ f$, formed (in connection with the outer case or lower ring $c$ to the wheel) by the buckets and central hub $g$, around which the buckets are arranged.

Hung within these discharging-mouths $f\ f$, on independent intermediate spindles $h\ h$, having their bearings in the hub $g$ and ring $c$ of the wheel, so as to rotate with the latter, are throttle-valves E E, which, taken collectively, operate as a gate to the wheel to stop and start it, by establishing or shutting off flow of water through the discharging-mouths $f\ f$, and which also serve to regulate the speed of the wheel, and to operate as buckets, accordingly as they are adjusted to open more or less wide said discharging-mouths, and their inclination varied relatively to the flow of water through the wheel.

Such gate or combination of throttle-valves may be operated as a whole, or collectively as regards the several valves, or, as they may be termed, valve-buckets, either by hand or by a governor driven by the wheel to keep up a uniform speed to the latter, or by both hand and governor at pleasure. This may be done in various ways or by different combinations of mechanism, but it is preferred to effect the operation and adjustment of said valves E E conjointly, and from or through the centre of the wheel or its shaft B, which is made hollow for the purpose.

Thus, arranged to pass freely down through said hollow shaft B, is a vertical second shaft, F, which has connected to or in lock with it, at or near its lower end, by a pin, $i$, arranged to pass through a vertical slot in the hollow shaft B, a disk, G, which, while by reason of said pin and slot, it rotates together with its shaft F, in common with the main shaft B, is independent of the latter, and free to rise and fall with its shaft F.

This disk has a groove, $k$, cut in or round its periphery, preferably intersected by outer radial slots $m\ m$, to facilitate detachment or gearing together of said disk with the throttle-valves E E, each of which latter has a projection, $n$, at or near its one end, that enters freely the circumferential groove $k$ of the disk, so that on raising or lowering the shaft F and disk G, the valves E E are made to more or less or wholly close or open, as required, the discharging-mouths $f\ f$.

The vertical adjustment of the shaft F and its disk G by hand or governor, may be effected through any suitable combination of mechanism, as, for instance, by means of a wheel, H, on a horizontal shaft, I, that has screws J J on it, which gear with worm-wheels K K, attached to vertical screws L L; and these latter screws, accordingly as they are turned to the right or left, made to lift a sliding cross-bar, M, that is connected as a movable bearing with the shaft F, which is further guided or steadied by a fixed bearing, N, with freedom to slide vertically through the latter while it is raised or lowered in common with the cross-bar M.

A gate arranged to rotate with the wheel, and to stop or start and regulate its speed as described, by controlling the discharging-mouths or outlets, is greatly superior, in many respects, to a gate which does not rotate with the wheel, and the former is in no way identical with the latter. Stationary gates, in fact, are apt to become choked by obstacles getting in with the water, and do not give that freedom in run of the wheel which a gate revolving in common with it does.

What is here claimed, and desired to be secured by Letters Patent, is—

1. The combination, with a horizontal water-wheel, of a gate to control the discharge from or through its buckets, arranged to rotate in common with said wheel, substantially as specified.

2. The independent throttle-valves E E to the discharging-mouths of the buckets, made to operate as additional buckets and revolving with the wheel, also being collectively adjustable to stop or start or regulate the speed of the wheel, essentially as described.

3. The adjustment of the gate, which controls the discharge-openings from the wheel, and rotates with the latter, from or through the centre of the wheel, essentially as specified.

JOHN CHASE.

Witnesses:
FRED. HAYNES,
J. W. COOMBS.